United States Patent [19]

Liang

[11] Patent Number: 5,395,656
[45] Date of Patent: Mar. 7, 1995

[54] METHOD AND COMPOSITION FOR TREATING WOOD

[76] Inventor: Jin Liang, 1304 Autumn Hills La., Stone Mountain, Ga. 30083

[21] Appl. No.: 15,233

[22] Filed: Feb. 9, 1993

[51] Int. Cl.$^6$ .......................... B05D 3/02; B05D 3/12; B05D 7/06
[52] U.S. Cl. ..................................... 427/393; 427/297; 427/317; 427/351; 427/399
[58] Field of Search ............... 427/297, 351, 393, 399, 427/317

[56] References Cited

U.S. PATENT DOCUMENTS

| | | | |
|---|---|---|---|
| 3,166,434 | 1/1965 | Gauger, Jr. | 427/317 |
| 3,406,038 | 10/1968 | Moren | 117/62.1 |
| 3,765,934 | 10/1973 | Gaylord | 427/297 |
| 3,790,401 | 2/1974 | Maine | 117/59 |
| 3,959,529 | 5/1976 | Winn et al. | 427/335 |
| 3,968,318 | 7/1976 | Betty | 427/393 |
| 3,985,921 | 10/1976 | Rowell et al. | 427/317 |
| 3,990,381 | 11/1976 | Shepherd et al. | 427/408 |
| 4,291,101 | 9/1981 | Tanizaki et al. | 428/514 |
| 4,301,215 | 11/1981 | Deubzer et al. | 428/447 |
| 4,399,195 | 8/1983 | Allen | 427/297 |
| 4,466,998 | 8/1984 | McIntyre et al. | 427/297 |
| 4,567,115 | 1/1986 | Trumble | 428/541 |
| 4,678,715 | 7/1987 | Giebler et al. | 427/297 |
| 4,832,987 | 5/1989 | Ueda et al. | 427/297 |
| 4,992,307 | 2/1991 | Ikeda | 427/297 |
| 4,992,308 | 2/1991 | Sunol | 427/297 |

FOREIGN PATENT DOCUMENTS 0013546  7/1980  Germany.

*Primary Examiner*—Shrive Beck
*Assistant Examiner*—Diana Dudash
*Attorney, Agent, or Firm*—Michael Drew

[57] ABSTRACT

A wood preservative composition which contains poly ethylene oxide along with poly vinyl pyrrolidone is applied to wood in a four-step process. In the first step, moisture and excess resin are removed from the wood. In the second step, the preservative composition is applied to the wood by pressure injection. In the third step, the container for the wood is drained and excess solution is transferred to a holding tank. In the fourth step, a catalyst, either heat or a low-pH composition, is applied to the wood to cause chemical bonding of the preservatives within and with the wood. As a part of the fourth step, excess moisture is removed from the wood by subjecting the wood to a vacuum to draw out excess moisture and then subjecting the wood to a flow of desiccated air which absorbs the moisture.

13 Claims, 3 Drawing Sheets

METHOD AND COMPOSITION FOR TREATING WOOD

TECHNICAL FIELD OF THE INVENTION

The present invention relates to a method and composition for treating wood, and more particularly to a method and composition for treating wood which increases the yield of useful lumber from harvested timber and decreases the curing time necessary from harvesting to final milling.

BACKGROUND OF THE INVENTION

A primary goal in producing lumber is to obtain as many useful board feet as possible from a given quantity of wood. A problem in achieving this goal is that some of the natural characteristics of wood and some of the properties imparted to wood during the curing process limit the amount of useful lumber which may be produced from a log. For example, natural characteristics such as knot holes and resin deposits limit the useful yield. Undesirable properties such as checking, warping, bending, twisting and decaying may be both natural tendencies as well as properties imparted by curing.

Another goal in the production of useful lumber is to cut logs into useful lumber as quickly as possible after harvesting of trees. A problem in achieving this goal is that allowing a cut log to cure (or dry) naturally without the aid of any artificial process is time-consuming and does not help reduce occurrences of the wood-deforming properties described above that are inherent in the natural drying of wood. Some current wood processing methods, such as treatment with chromated copper arsenate (CCA) or kiln drying, which reduce curing time may also alter the characteristics of wood such that many board feet of lumber cannot be used. Thus, it can be appreciated that it would be useful to have a method that both increases the yield of useful lumber from logs and reduces the time to produce useful lumber from harvested timber.

SUMMARY OF THE INVENTION

It is an object of the invention to provide a means for increasing the yield of useful lumber from harvested timber.

It is a further object of the invention to provide a method for increasing the yield of useful lumber while also reducing the time for producing useful lumber from harvested timber.

According to a preferred embodiment of the invention, a composition containing poly ethylene oxide (PEO) along with poly vinyl pyrrolidone (PVP) as the main preservative components, is applied to wood in a four-step process to cure the wood while optimizing and preserving its structural integrity.

In the first step of the four-step process, a vacuum is applied to extract moisture and excess resin from the wood, opening individual wood cells. In the second step of the process, the preservative composition is applied to the wood through pressure injection. In the third step, the wood charge is drained and a short "air-blow-down" period transfers excess preservative solution to a holding tank. In the fourth step, a catalyst (either heat or a low-pH composition) is applied to the wood to cause chemical bonding of the preservative within and with the cellulose structure of the wood. In a first option of step four, heat catalysis and drying are simultaneously accomplished through the projection of a stream of heated, desiccated air over the wood charge. In a second option of the fourth step, a chemical catalyst is applied by injecting the wood with a low-pH composition. After drainage of the chemical catalyst, desiccated air is used to remove residual moisture. The number of times that steps one and two are repeated and the lengths of steps three and four are related to the type of wood treated.

Other aspects, objects, features, and advantages of the present invention will become apparent to those skilled in the art upon reading the detailed description of preferred embodiments.

DETAILED DESCRIPTION OF PREFERRED EMBODIMENTS OF THE INVENTION

Figure 1:
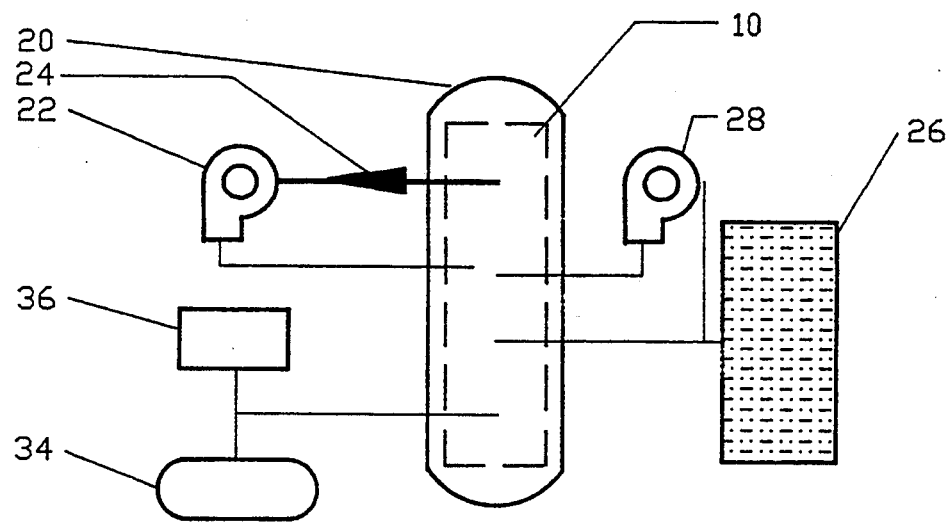
FIG. 1 is a schematic representation of the extraction phase of a method for treating wood according to a preferred embodiment of the invention.

While the specification concludes with claims particularly pointing out and distinctly claiming the subject matter which is regarded as the present invention, the invention will now be described with reference to the following description of embodiments taken in conjunction with the accompanying drawings.

In accordance with preferred embodiments of the invention, the structure of wood that is to be converted into useful timber is stabilized by impregnating the wood/timber with a composition containing poly ethylene oxide (PEO) as a preservative, poly ethylene glycol (PEG) as an additional preservative, and poly vinyl pyrrolidone (PVP) as a bonding agent. A fluid composition containing these preservative chemicals and, optionally, solvents, fungicides, biocides, coloring agents and fire retardants, is applied to wood in a process which extracts moisture and some resin from the wood and replaces them with the preservative composition. The process utilizing the composition increases the stability of wood while allowing the wood to be dried (or cured) very quickly.

The schematic illustrations of FIGS. 1–6 are used to illustrate the process described in detail below. The process for treating wood according to a preferred embodiment of the invention consists of a four-phase (or four-step) cycle to treat a quantity of wood. In the discussion which follows, the four-step cycle will be described in chronological order. Discussion of the preservative composition utilized will be interspersed with the discussion of the process and continued in more detail thereafter. In the schematic illustrations of FIGS. 1–6, the same physical elements used in different phases of the process are illustrated throughout the drawings and the same reference numerals are used to refer to like elements.

Referring generally to the illustrations, a convenient means of performing the steps of the process is to enclose the wood 10 to be treated (also referred to as the "wood charge") in a cylinder (chamber) 20 or similar isolating enclosure. The various steps of the process can then be controlled and carried out in the closed environment provided by the cylinder 20.

Step One

Referring first to FIG. 1, in the first phase, or step, of the process, moisture is withdrawn from freshly-harvested, green timber 10 by subjecting the timber to a full vacuum. The vacuum is applied through use of a vacuum pump 22 connected to the cylinder 20. Air is drawn from the cylinder 20 by the intake side of the pump 22 in the direction of the arrow 24 shown. The vacuum pump 22 will be used for additional purposes described below. The vacuum applied to the timber 10 reduces atmospheric pressure outside of the timber 10 causing moisture in the timber 10 to migrate outwardly, particularly toward the ends of the cut timber 10. As moisture leaves the cellulose structure of the wood the void thereby created can be replaced by the fluid preservative composition as described below. The applied vacuum also causes resins which are contained in the wood to migrate outwardly from the wood. A suitable vacuum to be applied is in the range of 25 inches to 27 inches Hg. As previously mentioned, and as will be discussed additionally below, the first two steps of the four-step cycle are repeated during the process. During each repetition of the first step additional moisture is removed, some resin is removed and some resin is redistributed. What is left behind are non-aqueous preservatives and more evenly distributed resin. After the first step of the process, as a resin solvent substance is applied to the wood during each repetition of the second step (described below), the resin in the wood is liquified and redistributed. Thus, during each subsequent vacuum step (the first step), liquid resin is redistributed to less entrapping areas and migrates outwardly, predominantly toward the ends of the wood.

Step Two

Figure 2:
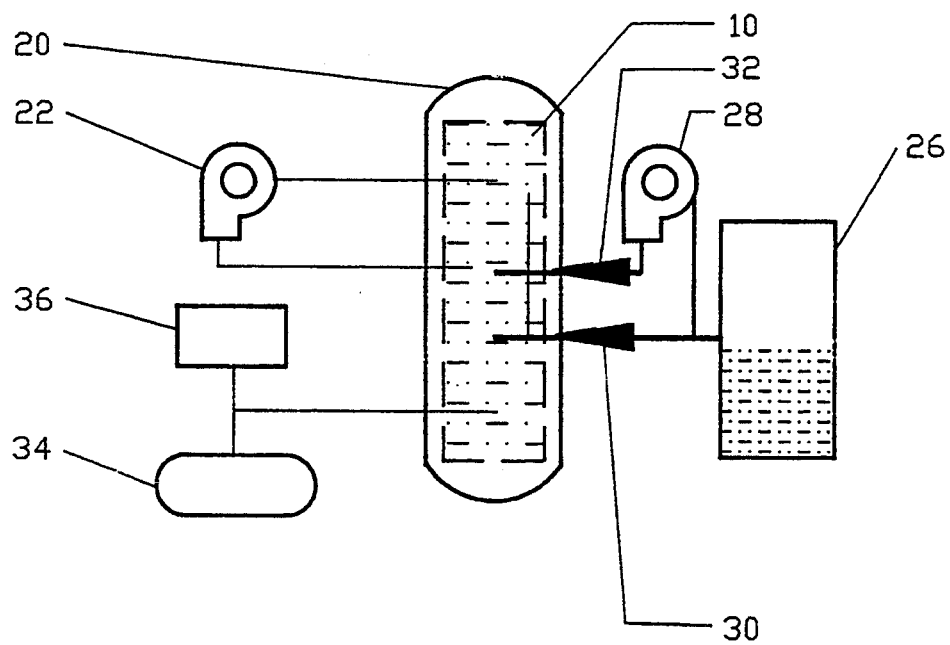
FIG. 2 is a schematic representations of the pressure-injection phase of the invention of FIG. 1.

Reference will now be made generally to FIG. 2 to describe the second step of the process. In the second step, moisture evacuated from the wood charge 10 during the first step is replaced by a preservative composition 26 which gives dimensional stability to the wood 10. The preservative composition may also contain chemicals which dissolve and redistribute resin, chemicals which inhibit the growth of fungus, stains and mold, and chemicals which prevent insect infestation. Each of these properties can be as important as dimensional stability in determining the total amount of usable lumber available after treatment. The preservative composition used in step two includes poly ethylene oxide (PEO) as a preservative (that is, to preserve cell structure), and may also include poly ethylene glycol (PEG) as a supplemental preservative. The composition also includes poly vinyl pyrrolidone (PVP) as a bonding agent for the preservative or preservatives. PVP creates crosslinks between PEO chains, between PEO and PEG chains and between PEO and PEG chains and wood cellulose. The composition may optionally include a resin solvent, fungicides, insecticides, wood colorings and fire retardants. The components of the composition are described in greater detail below.

Wood Stabilizer/Preservative

Poly ethylene oxide (PEO), when used alone or in combination with other preservatives with available hydroxide groups such as poly ethylene glycol (PEG), replaces the natural moisture and resins found in wood cellulose. The preservative stabilizes wood structure by preventing wood cells from collapsing when moisture departs. Preservation of original cell structure prevents the common problems of warping, twisting, bending, checking and shrinking. A primary reason for using PEO as a preservative is the stabilization it provides due to its ability to crosslink. Crosslinking can occur with the presence of available radical groups, which PEG makes available. PEG may be used in addition to PEO because it also contains available radical groups necessary for crosslinking.

Crosslinking Chemical (PVP)

Poly vinyl pyrrolidone (PVP) crosslinks individual PEO and/or PEG chains to give greater structural stability to the wood. This bridging and cellulose chemistry helps wood retain its original structure while also chemically bonding the preservative to the cellulose structure of the wood. The multiple bonds formed prevent leaching of the preservative composition from the wood, giving lifetime protection to the wood.

Chemicals to Impart Solvent, Fungicidal and Insecticidal Properties

The properties of wood which is treated utilizing the process and compositions described herein can be further enhanced by including chemicals to inhibit fungus, sapstain, mold and insect infestation and to help dissolve and redistribute wood resins. For example, a solution containing PEO and PVP can be mixed with glycol ether which when injected into the wood helps to dissolve and redistribute the naturally occurring resins. Wood resin is a natural structural stabilizer. However, pockets of resin cause wood deformities and are barriers to the injection of the preservative solution. The resin solvent dissolves pockets of resin, thereby allowing greater penetration of the preservative composition and eliminating the structural deformities that occur when wood dries around resin pockets. As resin is dissolved during the process, resin pockets are dissipated and resin is redistributed within the wood. Some resin is extracted along with moisture during steps one and two of the process, the remaining redistributed resin is valuable as a natural preservative. In addition to resin solvent, 10-mole borax, iodine and a Quaternary Ammonia Compound can be added to complement the biocidal properties of PVP to further protect the treated wood from fungus, sapstain, mold and insect infestation.

Preferred embodiments of the preservative composition will be discussed in more detail below.

In step two of the four-step process of the preferred embodiment, the treating composition is applied to timber 10 by way of pressurized treatment. Once moisture has been extracted from the wood 10 through the vacuum process, the chamber 20 is filled with the preservative composition described above and pressurized. As illustrated in FIG. 2, the wood-containing cylinder 20 is flooded with the preservative composition 26. In FIG. 2, the lower direction arrow 32 indicates the flow of composition 26 into the cylinder 20. After the cylinder 20 is filled with composition 26, the cylinder 20 is pressurized by the pressurized application of composition 26 through a pressure pump 28. Application of pressure from the pressure side of the pump 28 is indicated by the direction arrow 32. The pressure applied to the fluid forces the solution 26 through the wood fibers into the vacancies left by extracted moisture.

The first two steps of the process are repeated a number of times depending upon the type of wood to be treated. Three or four cycles of treatment are generally sufficient to fortify a soft wood such as pine. A greater number of cycles may be necessary to treat hard woods. For example, 5 or 6 cycles are generally suitable for treating hard woods such as oak and maple. During the process, each subsequent cycle of moisture removal draws water from the timber while allowing greater quantities of the chemicals and additives (PEO, PVP, PEG, borax, iodine, Quat, etc.) to remain intact and bonded or bondable to the cellulose structure of the wood. The composition 26 is applied by means of alternating pressure and vacuum in order to fully infiltrate the wood's cellulose structure.

Step Three

Figure 3:
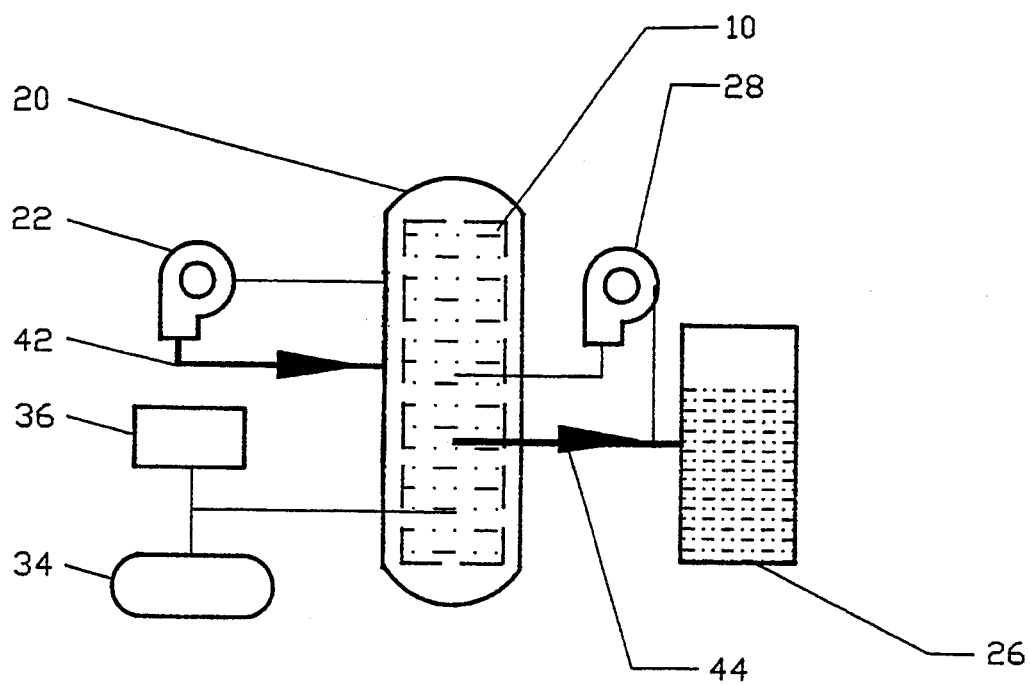
FIG. 3 is a schematic representation of the drainage and blow-down phase of the invention of FIG. 1.

Referring now to FIG. 3, after appropriate saturation of the wood with preservative composition 26, the third step of the treating process is undertaken. The third step involves the transfer of solution 26 from the treating chamber 20 back to a holding tank containing the composition 26. This is accomplished through a combination of gravity drain and air-blow-down to remove as much preservative solution 26 as possible from the chamber 20 before introduction of a reaction catalyst and drying. The cylinder 20 may be conveniently drained by means of a standard drain opening placed in the bottom of the cylinder 20. After the drain is opened to allow the composition 26 to flow back into a storage container for the composition 26, excess fluid remaining in the cylinder 20 and on the exterior of the wood charge is physically removed by a stream of air which "blows" the composition toward the drain of the cylinder 20. As schematically illustrated in FIG. 3, the discharge side of the pump 22 used to draw a vacuum in the cylinder 20 in the first step of the process may be used to blow air into the cylinder 20. The arrow 42 illustrates the use of the pump 22 to effect the "blowdown" phase of the process while the arrow 44 indicates return of the composition 26 to a storage area.

Step Four

Figure 4:
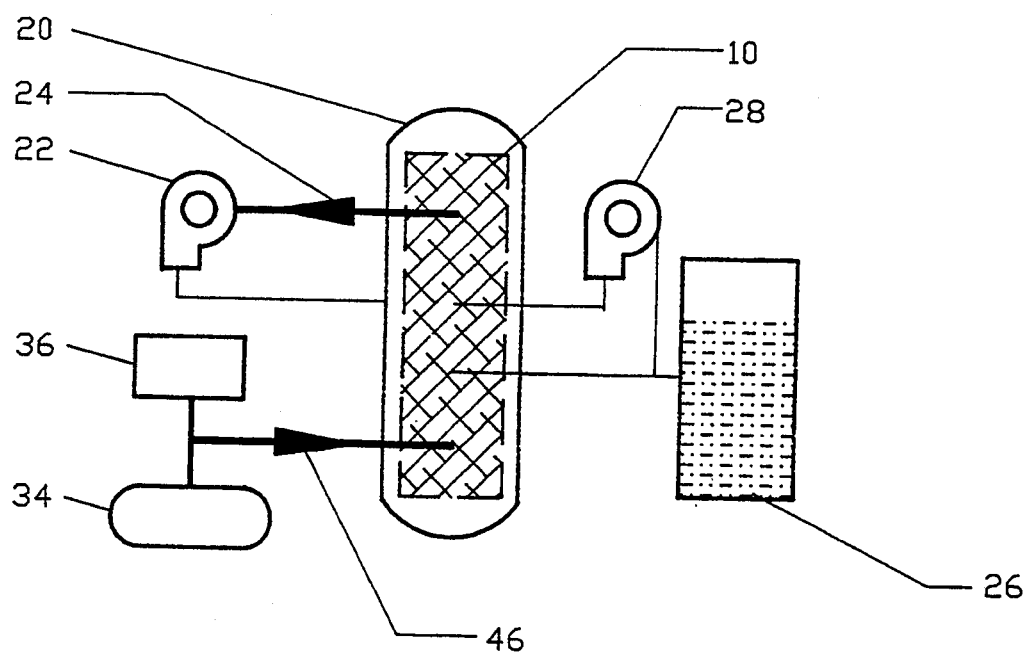
FIG. 4 is a schematic representation of the first option of the catalytic-drying cycle of the invention of FIG. 1.

The fourth step of the process is a combined step of "setting" the preservative composition 26 in-situ and removing amounts of moisture from the cylinder 20 and wood charge 10. Two options for achieving setting and final drying are illustrated and described herein. "Setting" is accomplished through utilization of a catalyst. The catalyst promotes crosslinking of PVP with PEO, PEG and wood cellulose. This crosslinking results in permanent "setting" of the preservative composition 26 in the wood 10. The catalyst may be heat or a low-pH composition. Heated air is a suitable method of applying heat. Referring to FIG. 4, in a first option for setting and drying, the wood charge is subjected to a stream of heated, desiccated air. The raised temperature of the air serves as a heat catalyst. The desiccated air provides drying through the absorption of moisture from the wood charge 10. As illustrated in FIG. 4, the vacuum pump 22 is used to withdraw air from the cylinder 20. Desiccated air 34, or superdry air, may be provided in any conventional manner such as by passing air through a desiccant such as activated alumina. The desiccated air 34 is heated by any conventional means such as the use of a heat exchanger 36. The desiccated air 34 is stored under pressure so that when it is released into the cylinder 20 the wood charge 10 will be subjected to a positive air pressure. The purpose of positive air pressure is to force air into the wood. A suitable manner of storing the desiccated air 34 under pressure is to place the desiccated air in a closed container by means of a compressor. The applied vacuum induced by the vacuum pump 22 causes air to exit the cylinder 20 in the direction of the arrow 24 and induces the heated, desiccated air to enter the cylinder 20 as illustrated by the direction arrow 46. Application of heated, dry air is accomplished through a brief cycle of applying full vacuum then injection of the heated, desiccated air. A full vacuum is drawn and held momentarily to draw the excess moisture from the inside of the wood to the outer surface. The vacuum is then released and the chamber is flooded with the heated, desiccated air 34. The desiccated air 34 creates a positive pressure in the cylinder 20 because it has been stored under pressure. Moisture which has collected at the outer surfaces of the log evaporates into the desiccated air. The positive air pressure forces the heated, dry air into the wood, increasing the crosslinking action inside the wood, while speeding up the drying process. A suitable catalytic temperature is the range of about 60 degrees C. to about 150 degrees C. Additional cycles of vacuum-drying may be required when air temperature is less than 60 degrees C. Higher temperatures promote quicker crosslinking. However, at temperatures greater than 150 degrees C., no additional benefits are gained and, undesirably, PVP will begin to bond with itself.

Figure 5:
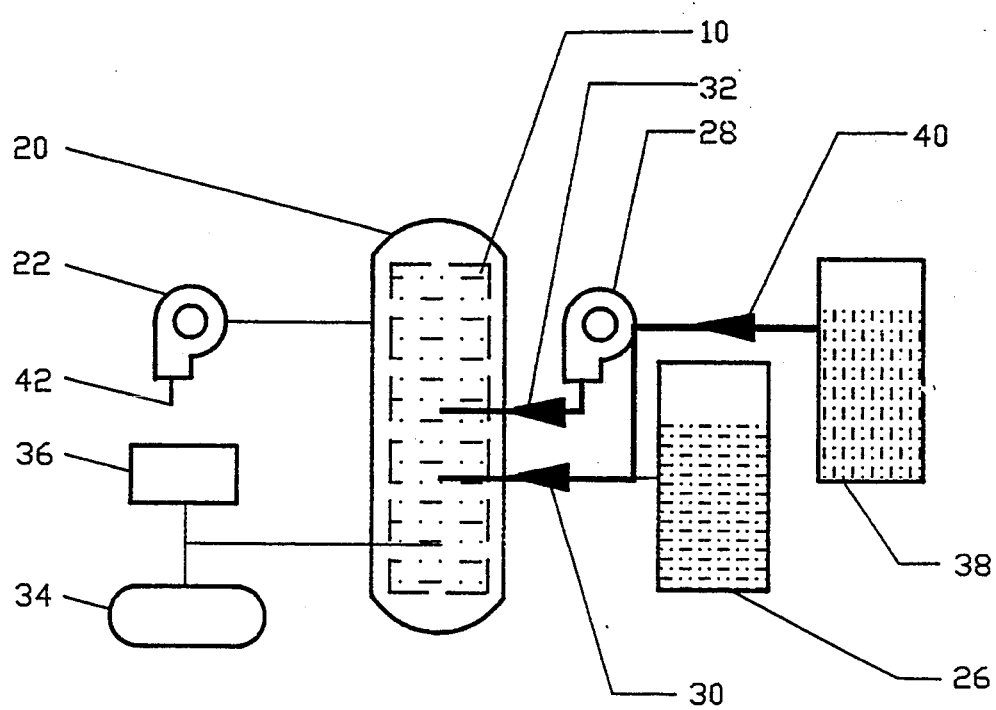
FIG. 5 is a schematic representation of the catalyst application portion of the second option of the catalytic-drying cycle of the invention of FIG. 1.
Figure 6:
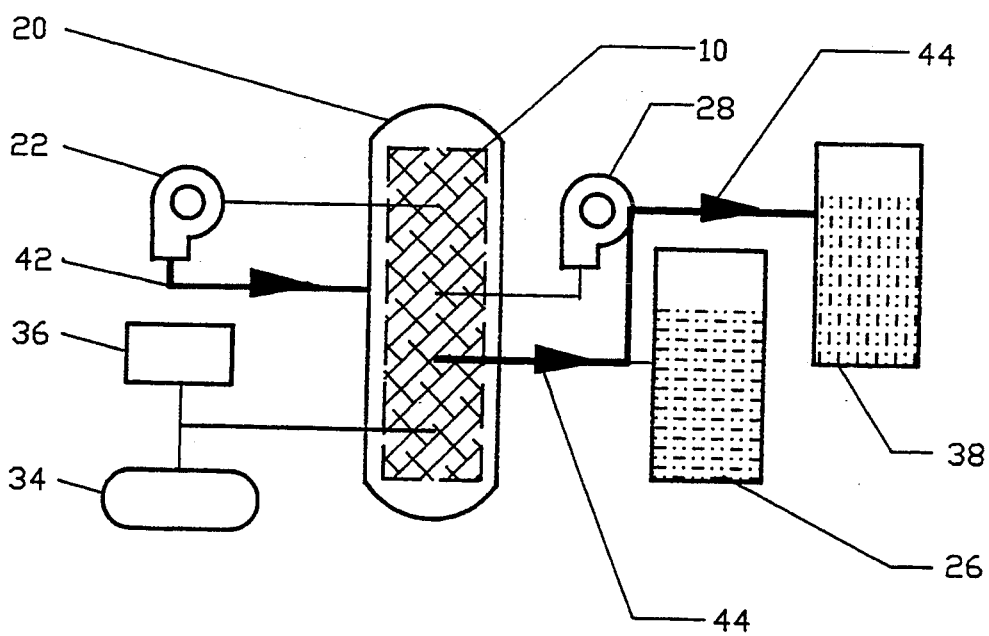
FIG. 6 is a schematic representation of the drainage and blow-down portion of the second option of the catalytic-drying cycle of the invention of FIG. 1.

Referring now to FIG. 5, therein is schematically illustrated the second option to step four, that is, the setting-drying phase, of the process. In this option, "setting" is achieved through application of a low-pH chemical catalyst such as chromated copper arsenate (CCA) or maleic acid. The chemical catalyst 38 is applied to the wood charge 10 under pressure in the same manner as the preservative composition 26 was applied in step two, as illustrated in FIG. 2. Referring now to FIG. 6, the chemical catalyst 38 is drained and removed from the cylinder 20 in the same manner as drainage and "blow-down" of preservative chemical solution 26 is achieved in step three, as illustrated in FIG. 3. Drainage and blow-down of the chemical catalyst 38 is followed by application of a stream of desiccated air, as illustrated in FIG. 4. The desiccated air may be heated, as in the first alternative of step four, but is not necessary since a chemical rather than heat catalyst is used. The short cycle of vacuum followed by desiccated air is again used.

As with steps one and two, steps three and four vary in length and number of cycles depending on the type of wood being treated and the desired level of dryness of the wood prior to removal from the chamber.

Once the wood charge has been subjected to all four steps of the process, its cellulose structure has been fortified, its resin deposits have been more evenly distributed, biocides have been added to prevent the formation and spread of fungus, molds and sapstain, and its moisture content has been substantially decreased. An additional open-air drying period of a few days helps to set the preservative while completely drying the wood.

After treatment by the above-described process, the preservative-treated timber can be processed into useful lumber within the same week. This significantly reduces on-site inventory costs for lumber suppliers through the ability to establish a "just-in-time" supply system. Wood treated by the process described herein retains its natural look and feel as well as its pre-treatment structure. These characteristics are permanently maintained through the crosslinking of the preservative composition with the wood cellulose.

The primary chemicals used in the preservative composition, namely, poly ethylene oxide (PEO) and poly vinyl pyrrolidone (PVP), are non-hazardous in comparison to other wood treating chemicals such as commonly used chromated copper arsenate (CCA).

Suitable formulations of the preservative composition/solution described above, demonstrate effectiveness in the following range of concentrations:

| Preservative Composition: | |
|---|---|
| Poly vinyl pyrrolidone (PVP): | 0.5 to 3.0 percent |
| Poly ethylene oxide (PEO): | 0.3 to 3.0 percent |
| Glycol Ether | 5.0 to 10.0 percent |
| Borax 10 mole: | 0.5 to 2.5 percent |
| Water: | balance |
| And | |
| Optionally: | |
| Poly ethylene glycol (PEG): | 1.0 to 7.0 percent |
| Fungicides, insecticides, wood colorings and fire retardants: | |
| Quaternary Ammonium Compounds (Quat): | 0.01 to 0.3 percent |
| Iodine: | 0.05 to 0.2 percent |
| Water-Borne Dying Agent: | 0.5 to 5.0 percent |
| Water-Borne Fire Retardant: | 2.5 to 7.5 percent |

Examples of suitable water-borne dying agents are Metal Complex Direct Dyes such as the commercially available compounds sold under the tradenames Lumicrease ® and Nerosole ®. Examples of suitable waterborn fire retardants are Sodium Tungstate or Guanyl Urea Phosphate and Boric Acid.

A suitable formulation for the chemical catalyst is as follows:

| Low-pH Catalyst: | |
|---|---|
| Maleic Anhydride: | 0.2 to 5.0 percent |
| Borax 10 mole: | 0.5 to 2.5 percent |
| Water: | balance |
| OR | |
| Chromated Copper Arsenate (CCA): | 1.2 to 3.0 percent |
| Water: | balance |

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A method for treating wood comprising the steps of:
    first, subjecting the wood to at least one repetition of
        a step of extracting moisture from the wood followed by,
        a step of imbuing the wood with an aqueous solution having
            about 0.5 percent to about 3.0 percent by volume poly vinyl pyrrolidone,
            about 0.3 percent to about 3.0 percent by volume poly ethylene oxide, and
            about 5.0 percent to about 10.0 percent by volume glycol ether;
    next, causing said poly vinyl pyrrolidone to crosslink chains of said poly ethylene oxide and to crosslink chains of said poly ethylene oxide and cellulose of the wood; and
    finally, removing additional moisture from the wood.

2. The invention of claim 1, said step of extracting moisture from the wood comprising subjecting the wood to a vacuum of from about 25 inches to about 27 inches Hg.

3. The invention of claim 1, said step of removing additional moisture from the wood comprising first, applying a vacuum to cause moisture to migrate to an outer periphery of the wood and then, subjecting the wood to a flow of desiccated air.

4. The invention of claim 1, wherein said step of causing said poly vinyl pyrrolidone to crosslink chains of said poly ethylene oxide and to crosslink chains of said poly ethylene oxide and cellulose of the wood and said step of removing additional moisture from the wood are performed simultaneously and comprise applying a vacuum to cause moisture to migrate to an outer periphery of the wood and subjecting the wood to heated, desiccated air supplied at a pressure of at least 15 psi and heated to a temperature in a range of from about 60 degrees C. to about 150 degrees C.

5. The invention of claim 1, said step of causing said poly vinyl pyrrolidone to crosslink chains of said poly ethylene oxide and to crosslink chains of said poly ethylene oxide and cellulose of the wood including applying a chemical catalyst to the wood.

6. The invention of claim 5, said chemical catalyst comprising an amount of maleic acid effective to serve as a chemical catalyst.

7. The invention of claim 5, said chemical catalyst comprising an amount of chromated copper arsenate effective to serve as a chemical catalyst.

8. The invention of claim 1, said aqueous solution also having from about 1.0 percent to about 7.0 percent by volume poly ethylene glycol.

9. A method for treating wood comprising the steps of:
    first, subjecting the wood to at least one repetition of
        a step of subjecting the wood to a first vacuum to extract moisture followed by,
        a step of applying to the wood at a pressure of from about
            140 psi to about 160 psi an aqueous solution having
                from about 0.5 percent to about 3.0 percent by volume poly vinyl pyrrolidone,
                from about 0.3 percent to about 3.0 percent by volume poly ethylene oxide, and
                from about 5.0 percent to about 10.0 percent by volume glycol ether;
    next, subjecting the wood to a second vacuum to cause moisture to migrate to the outer periphery of the wood;
    next, causing said poly vinyl pyrrolidone to crosslink chains of said poly ethylene oxide and to crosslink chains of said poly ethylene oxide and cellulose of the wood; and
    finally, subjecting the wood to a current of desiccated air.

10. The invention of claim 9, wherein said first vacuum and said second vacuum are of from about 25 inches to about 27 inches Hg.

11. The invention of claim 9, the step of causing said poly vinyl pyrrolidone to crosslink chains of said poly ethylene oxide and to crosslink chains of said poly ethylene oxide and cellulose of the wood including applying to the wood at a pressure of from about 140 psi to about 160 psi an amount of maleic acid effective to serve as a chemical catalyst.

12. The invention of claim 9, the step of causing said poly vinyl pyrrolidone to crosslink chains of said poly ethylene oxide and to crosslink chains of said poly ethylene oxide and cellulose of the wood including applying to the wood at a pressure of from about 140 psi to about 160 psi an amount of chromated copper arsenate effective to serve as a chemical catalyst.

13. The invention of claim 9, said aqueous solution also having from about 1.0 percent to about 7.0 percent by volume poly ethylene glycol.

* * * * *